(12) United States Patent
Dyer et al.

(10) Patent No.: US 6,492,290 B1
(45) Date of Patent: Dec. 10, 2002

(54) MIXED CONDUCTING MEMBRANES FOR SYNGAS PRODUCTION

(75) Inventors: Paul Nigel Dyer, Allentown, PA (US); Michael Francis Carolan, Allentown, PA (US); Darryl Butt, Gainesville, FL (US); Rene Hendrick Elias Van Doorn, Neckarsulm (DE); Raymond Ashton Cutler, Bountiful, UT (US)

(73) Assignee: Air Products and Chemicals, Inc., Allentown, PA (US)

( * ) Notice: Subject to any disclaimer, the term of this patent is extended or adjusted under 35 U.S.C. 154(b) by 87 days.

(21) Appl. No.: 09/643,698

(22) Filed: Aug. 22, 2000

(51) Int. Cl.⁷ .................. B01D 53/22; B01D 71/02; B01J 12/00; C01B 3/34
(52) U.S. Cl. ............. 502/4; 502/300; 502/325; 502/344; 502/353; 96/11; 252/519.1
(58) Field of Search .............. 252/519.1; 502/4, 502/20, 300, 325, 344, 354; 96/11; 422/83, 190, 222

(56) References Cited

U.S. PATENT DOCUMENTS

| | | | |
|---|---|---|---|
| 5,306,411 A | 4/1994 | Mazanec et al. | 204/265 |
| 5,356,728 A | 10/1994 | Balachandran et al. | 429/8 |
| 5,580,497 A | 12/1996 | Balachandran et al. | 252/519 |
| 5,712,220 A | 1/1998 | Carolan et al. | 502/400 |
| 5,972,296 A | 10/1999 | Hardtl et al. | 422/83 |
| 6,033,632 A | 3/2000 | Schwartz et al. | 422/190 |
| 6,056,807 A | 5/2000 | Carolan et al. | 96/4 |
| 6,077,323 A | 6/2000 | Nataraj et al. | 48/198.1 |

FOREIGN PATENT DOCUMENTS

| | | | |
|---|---|---|---|
| WO | 9840160 | 9/1998 | C01B/21/26 |
| WO | 0123078 | 4/2001 | B01D/71/02 |

OTHER PUBLICATIONS

Ji et al "Catalytic properties of perovskite oxides or iron", Gaodeng Xuexiao Huaxue Xuebao (1990), 11(5), 49105. Abstract Only.*

Isupova, et al., XP-001037684 "Physicochemical and Catalytic Properties", Kinetics and Catalysis, vol. 41, No. 2, 2000 pp. 287-291.

* cited by examiner

Primary Examiner—Mark Kopec
(74) Attorney, Agent, or Firm—Keith D. Gourley

(57) ABSTRACT

This invention presents a new class of multicomponent metallic oxides which are particularly suited toward use in fabricating components used in processes for producing syngas. The non-stoichiometric, A-site rich compositions of the present invention are represented by the formula $(Ln_xCa_{1-x})_y FeO_{3-\delta}$ wherein Ln is La or a mixture of lanthanides comprising La, and wherein $1.0>x>0.5$, $1.1 \geq y>1.0$ and $\delta$ is a number which renders the composition of matter charge neutral. Solid-state membranes formed from these compositions provide a favorable balance of oxygen permeance and resistance to degradation when employed in processes for producing syngas. This invention also presents a process for making syngas which utilizes such membranes.

9 Claims, 4 Drawing Sheets

MIXED CONDUCTING MEMBRANES FOR SYNGAS PRODUCTION

STATEMENT REGARDING FEDERALLY SPONSORED RESEARCH OR DEVELOPMENT

This invention was made with Government support under Cooperative Agreement DE-FC26-97PC96052 awarded by the United States Department of Energy. The Government has certain rights in this invention.

BACKGROUND OF THE INVENTION

Synthesis gas (syngas) containing hydrogen and carbon oxides is an important feedstock for the production of a wide range of chemical products. Syngas mixtures having controlled ratios of hydrogen and carbon monoxide are catalytically reacted to produce liquid hydrocarbons and oxygenated organic compounds including methanol, acetic acid, dimethylether, oxoalcohols and isocyanates. The syngas product can be further processed and separated to yield high purity hydrogen and carbon monoxide. The cost of generating the syngas is frequently the largest part of the total cost of preparing these products.

Two major reaction routes are commonly used by industry for syngas production, namely steam reforming of light hydrocarbons, primarily natural gas, naphtha and refinery offgases, and the partial oxidation of carbon-containing feed stocks ranging from natural gas to high molecular weight liquid or solid carbonaceous materials. Autothermal reforming is an alternate process which uses a light hydrocarbon feed which combines features of partial oxidation and steam reforming reactions in a single reactor. A concise review of such processes is described in U.S. Pat. No. 6,077,323. Such processes typically require oxygen in purities of greater than 95 vol %, which is available from cryogenic air separation in large tonnage volumes or pressure swing absorption for smaller volumes.

Alternative processes have been developed for syngas production wherein oxygen necessary to conduct the partial oxidation reaction is provided in situ by the separation of air at high temperatures using solid-state membranes which conduct oxygen ions and electrons under operating conditions. Solid-state membranes which conduct oxygen ions and electrons are also known as mixed conducting membranes. Such mixed conducting membranes can be used in combination with appropriate catalysts to produce syngas in a membrane reactor eliminating the need for a separate oxygen production step. A membrane reactor typically has one or more reaction zones, wherein each reaction zone comprises a mixed conducting membrane which separates each reaction zone into an oxidant side and a reactant side.

Multicomponent metallic oxides are represented in the art by formulae which present one or more "A-site" metals and one or more "B-site" metals. By way of example, U.S. Pat. No. 5,306,411 discloses certain multicomponent metallic oxides having the perovskite structure represented by the formula $A_sA'_tB_uB'_vB''_wO_x$, wherein A represents a lanthanide, Y or a mixture thereof; A' represents an alkaline earth metal or mixture thereof; B represents Fe; B' represents Cr, Ti or a mixture thereof; and B'' represents Mn, Co, V, Ni, Cu or a mixture thereof, and s, t, u, v, w and x each represent a number such that s/t equals from about 0.01 to about 100; u equals from about 0.01 to about 1; v equals from about 0.01 to 1; w equals from 0 to about 1; x equals a number that satisfies the valences of A, A', B, B' and B'' in the formula; provided that $0.9<(s+t)/(u+v+w)<1.1$. In a preferred embodiment A' is calcium or strontium and B'' represents Mn or Co or a mixture thereof. These multicomponent metallic oxides require chromium or titanium as a B-site element.

Multicomponent metallic oxides depicted by formulae presenting A-site metals and B-site metals may be stoichiometric compositions, A-site rich compositions or B-site rich compositions. Stoichiometric compositions are defined as materials wherein the sum of the A-site metal stoichiometric coefficients equals the sum of the B-site metal stoichiometric coefficients. A-site rich compositions are defined as materials wherein the sum of the A-site metal stoichiometric coefficients is greater than the sum of the B-site metal stoichiometric coefficients. B-site rich compositions are defined as materials wherein the sum of the B-site metal stoichiometric coefficients is greater than the sum of the A-site metal stoichiometric coefficients.

U.S. Pat No. 6,033,632 discloses a solid-state membrane for use in a catalytic membrane reactor which utilizes a membrane fabricated from a multicomponent metallic oxide having the stoichiometry $A_{2-x}A'_xB_{2-y}B'_yO_{5+z}$, wherein A is an alkaline earth metal ion or mixture of alkaline earth metal ions; A' is a metal ion or mixture of metal ions where the metal is selected from the group consisting of metals of the lanthanide series and yttrium; B is a metal ion or mixture of metal ions, wherein the metal is selected from the group consisting of 3d transition metals and the group 13 metals; B' is a metal ion or mixture of metal ions where the metal is selected from the group of the 3d transition metals, the group 13 metals, the lanthanides and yttrium; x and y are independently of each other numbers equal to or greater than zero and less than 2; and z is a number that renders the compound charge neutral. In a preferred embodiment the 3d transition metal is Fe and the group 13 metal is Ga, whereas A' preferably is La and A is Sr and Ba.

U.S. Pat. Nos. 5,356,728 and 5,580,497 disclose cross-flow electrochemical reactor cells formed from multicomponent metallic oxides which demonstrate electron conductivity and oxygen ion conductivity at elevated temperatures. According to both documents, suitable multicomponent metallic oxides are represented by $(Sr_{1-y}M_y)_\alpha(Fe_{1-x}Co_x)_{\alpha+\beta}O_\delta$,  wherein M is a metal selected from the group consisting of elements having atomic number in a range from 56 to 71, calcium and yttrium, x is a number in a range from about 0.01 to about 0.95, y is a number in a range from about 0.01 to about 0.95, $\alpha$ is a number in a range from about 1 to about 4, $\beta$ is a number in a range upward from 0 to about 20, such that $1.1<(\alpha+\beta)/\alpha\leq6$, and $\delta$ is a number which renders the compound charge neutral.

U.S. Pat. No. 6,056,807 teaches a fluid separation device capable of separating oxygen from an oxygen-containing gaseous mixture which utilizes at least one solid-state membrane comprising a dense mixed conducting multicomponent metallic oxide layer formed from a composition of matter represented by the formula:

$$Ln_xA'_{x'}A'_{x''}B_yB'_yO_{3-z},$$

wherein Ln is an element selected from the f block lanthanides, A' is selected from group 2, A" is selected from groups 1, 2 and 3 and the f block lanthanides and B and B' are independently selected from the d block transition metals, excluding titanium and chromium, wherein $0\leq x<1$, $0<x'\leq1$, $0\leq x''<1$, $0<y<1.1$, $0\leq y'<1.1$, $x+x'+x''=1.0$, $1.1>y+y'>1.0$ and z is a number which renders the compound charge neutral. This reference discloses B-site rich non-stoichiometric compositions because the sum of the x indices is 1.0 and the sum of the y indices is greater than 1.0.

U.S. Pat. No. 5,712,220 presents a class of multicomponent metallic oxides which are well suited toward use in fabricating components used in solid-state oxygen separation devices. While the reference relates primarily to B-site rich compositions, the reference discloses A-site rich non-stoichiometric compositions represented by the formula $Ln_xA'_{x'}A''_{x''}B_yB'_{y'}B''_{y''}O_{3-z}$ wherein Ln is an element selected from the f block lanthanides, A' is selected from Group 2, A" is selected from Groups 1, 2 and 3 and the f block lanthanides and B, B' and B" are independently selected from the d block transition metals, excluding titanium and chromium, wherein $0 \leq x < 1$, $0 < x' < 1$, $0 \leq x'' < 1$, $0 < y < 1.1$, $0 < y' < 1.1$, $0 < y'' < 1.1$, $x+x'+x''=1.0$ $0.9 < y+y'' < 1.0$ and z is a number which renders the compound charge neutral wherein such elements are represented according to the Periodic Table of the Elements adopted by IUPAC.

A solid-state membrane employed in a process for making syngas is exposed to severe reaction conditions such as temperatures above 600° C., a large pressure difference across the solid-state membrane, a highly oxidizing environment on one surface, and a water, hydrogen, methane, carbon monoxide and carbon dioxide containing reactant gas stream on the other surface. Therefore, the solid-state membrane must have sufficiently high oxygen flux, a sufficient chemical stability in the syngas and air environments, a sufficiently low creep rate under the applied mechanical load, a sufficient resistance to demixing of the metal cations and a sufficiently low chemical expansion under the membrane operating conditions.

Numerous compositions known in the art for fabricating solid-state membranes do not adequately meet all the above criteria. Although some compositions are known to meet the oxygen flux criteria, for example, these compositions typically may not meet one or more other criteria as listed above. These criteria are nevertheless highly sought after for development of an economically viable technology based on solid-state membranes.

Researchers continue to search for suitable solid-state membranes that will economically and reliably produce syngas through the oxidation of methane and partially reformed methane feed stocks. More in detail, researchers are searching for mixed conducting multicomponent metallic oxides suitable for use in fabricating the dense layer of a solid-state membrane which meet the above criteria.

BRIEF SUMMARY OF THE INVENTION

Applicants have discovered a new class of A-site rich non-stoichiometric multicomponent metallic oxides which are particularly suited toward use in solid-state membranes suitable for use in processes for producing synthesis gas (syngas). These compositions of matter overcome problems associated with many prior art compositions of matter by providing a favorable balance of oxygen permeance, resistance to degradation, favorable sintering properties and coefficients of thermal expansion which are compatible with other materials used to fabricate solid-state membranes.

The compositions of matter according to the invention are represented by the formula:

$$(Ln_xCa_{1-x})_yFeO_{3-\delta}$$

wherein
Ln is La or a mixture of lanthanides comprising La, and wherein
$1.0 > x > 0.5$
$1.1 \geq y > 1.0$ and
$\delta$ is a number which renders the composition of matter charge neutral.

In a preferred embodiment, $0.98 > x > 0.75$ and $1.05 \geq y \geq 1.01$.

The invention also presents solid-state membranes which comprise a first side and a second side wherein the solid-state membrane comprises a dense layer formed from a composition of matter represented by the formula:

$$(Ln_xCa_{1-x})_yFeO_{3-\delta}$$

wherein
Ln is La or a mixture of lanthanides comprising La, and wherein
$1.0 > x > 0.5$
$1.1 \geq y > 1.0$ and
$\delta$ is a number which renders the composition of matter charge neutral.

In a preferred embodiment, the dense layer of the solid-state membrane is formed from a composition of matter according to the formula wherein $0.98 > x > 0.75$ and $1.05 \geq y \geq 1.01$.

The solid state membranes may further comprise any number of additional layers to enhance performance and durability. Such additional layers may include a porous mixed conducting multicomponent metallic oxide layer contiguous to the dense layer. The solid-state membranes which comprise a dense layer and any number of additional layers may be fabricated into a variety of shapes including flat plates or tubes. These solid-state membranes possess two exterior sides, referred to as the first side and the second side.

For example, one can envision the two sides of a coin in the case of a flat plate or the interior and exterior surfaces of a tube. Such solid-state membranes may also include a catalyst on the first side, a catalyst on the second side or on the first side and the second side meaning the surfaces of the membrane which will be in contact with the oxygen-containing feed gas and the methane-containing reactant gas during operating of the syngas process of this invention.

By way of example, the first side may be referred to as the reactant side and the second side may be referred to as the oxidant side. Suitable catalysts to be deposited onto the reactant side of the solid-state membrane are conventional reforming catalysts or partial oxidation catalysts such as a metal or an oxide of a metal selected from Groups 5, 6, 7, 8, 9, 10, 11 of the Periodic Table of the Elements according to the International Union of Pure and Applied Chemistry. Preferred metals or oxides of metals are selected from the group consisting of nickel, cobalt, iron, platinum, palladium, and silver.

By way of example, the second side of the solid-state membrane may be referred to as the oxidant side. Suitable catalysts to be deposited onto the oxidant side are conventional oxygen reduction catalysts such as a metal or an oxide of a metal selected from the Groups 2, 5, 6, 7, 8, 9, 10, 11 and 15 and the F block lanthanides of the Periodic Table of the Elements according to the International Union of Pure and Applied Chemistry. Preferred metals or oxides of metals are selected from the groups consisting of platinum, palladium, ruthenium, gold, silver, bismuth, barium, vanadium, molybdenum, cerium, praseodymium, cobalt, rhodium and manganese. Optionally, the catalyst may be any multicomponent metallic oxide which catalyzes the desired reaction.

The invention also presents a process for producing a synthesis gas product comprising hydrogen and carbon monoxide comprising the steps of:

a) providing a reaction zone having an oxidant side and a reactant side which are separated by a solid-state membrane comprising a dense layer formed from a composition of matter represented by the formula:

$$(Ln_xCa_{1-x})_yFeO_{3-\delta}$$

wherein
Ln is La or a mixture of lanthanides comprising La, and wherein
$1.0 > x > 0.5$
$1.1 \geq y > 1.0$ and
$\delta$ is a number which renders the composition of matter charge neutral, b) heating an oxygen-containing feed gas and introducing the resulting heated oxygen-containing feed gas in the oxidant side of the reaction zone at an oxidant feed temperature and an oxidant gas feed pressure;

c) heating a methane-containing reactant gas and introducing the resulting heated methane-containing reactant gas in the reactant side of the reaction zone at a reactant gas feed temperature and a reactant gas feed pressure;

d) permeating oxygen from the oxidant side of the reaction zone through the solid-state membrane to the reactant side of the reaction zone and reacting the oxygen with the methane-containing reactant gas to form the synthesis gas product;

e) withdrawing the synthesis gas product from the reactant side of the reaction zone at a product gas outlet temperature; and f) withdrawing an oxygen depleted gas stream from the oxidant side of the reaction zone at a product gas outlet temperature.

The oxygen containing feed gas in step (b) is preferably heated by direct combustion with a fuel in a direct-fired combustor to produce a hot, pressurized combustion product to provide the heated oxygen-containing feed gas.

Optionally, the process further comprises the steps of:

g) introducing a heated gaseous stream comprising steam and one or more hydrocarbons into a catalytic reforming reaction zone comprising at least one catalyst which promotes steam reforming of hydrocarbons to form a partially reformed intermediate gas comprising at least methane, hydrogen and carbon oxides; and h) introducing the partially reformed intermediate gas into the reactant side of the reaction zone of step c).

Preferred operating conditions are defined for feed gas and product gas temperatures and for the pressure differential across the membrane during operation of the process. For example, the reactant feed gas temperature is between 950° F. (510+ C.) and 1400° F. (760° C.) and the product gas outlet temperature is greater than about 1500° F. (815° C.). The oxidant gas feed pressure is between 1 psig (0.069 barG) and 45 psig (3.1 barG). The reactant gas feed pressure is between 100 psig (6.9 barG) and 900 psig (62 barG) and the oxidant gas feed temperature is up to 200° F. (111° C.) greater than the reactant gas feed temperature. The oxidant gas feed temperature is preferably less than the oxygen-depleted oxidant gas temperature.

Applicants' invention can be more readily understood by referring to the Detailed Description of the Invention and the Figures which are attached hereto.

BRIEF DESCRIPTION OF THE DRAWINGS

The invention and specific embodiments thereof may be illustrated by the attached drawings, wherein.

DETAILED DESCRIPTION OF THE INVENTION

Figure 1:
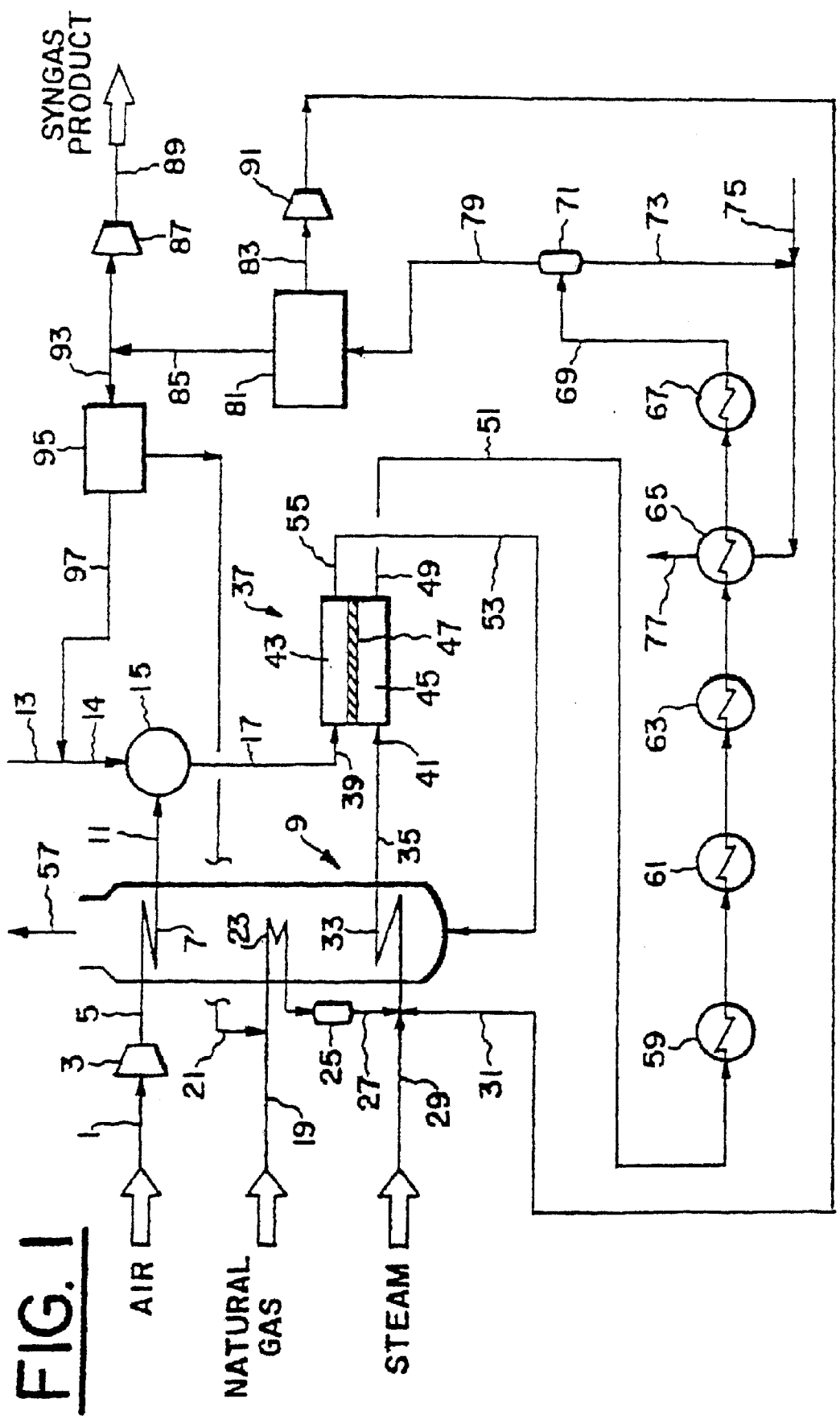
FIG. 1 is a process flow diagram of an embodiment of the process of the invention for producing a synthesis gas product.

The following definitions shall apply to terms used in the Specification and appended claims.

The term "dense" in the context of the "dense layer" of the solid-state membrane shall mean a solid-state membrane layer formed from the compositions of this invention which has no connected through porosity meaning that the dense layer is substantially impervious to the passage of oxygen-containing or reactant gases. Minor amounts of transport of gases across the dense layer of the solid-state membrane may occur without detriment to utility of the invention. The dense layer of the solid-state membranes of this invention conducts oxygen anions and electronic species under operating conditions and in this sense are permeable to oxygen ions, but not molecular oxygen.

The term "porous" in the context of a porous layer shall mean a membrane layer of a solid-state membrane which possesses a network of pores such that the oxygen-containing feed gas can diffuse through the porous layer to make contact with the dense layer of the solid-state membrane.

The term "an oxygen-containing feed gas" shall be used broadly herein to include gases and mixtures of gases in which at least one of the component gases is oxygen or an oxide. The oxygen or oxide component of the gas is capable of being reduced at the surface of the solid-state membrane of this invention. The oxygen-containing gas may include carbon, nitrogen, and sulfur oxides ($CO_x$, $NO_x$, and $SO_x$) among others, and gas mixtures in which an oxide is a component, e.g. $NO_x$ in an inert gas or in another gas not reactive with the solid-state membrane. The term also includes mixtures of oxygen in other gases, e.g. $O_2$ in air.

The term "a methane-containing reactant gas" shall refer to gases or mixtures of gases containing methane, including but not limited to methane, natural gas (whose major component is methane), and gaseous hydrocarbons including light hydrocarbons (as this term is defined in the chemical arts). The term also refers to mixtures of methane which include inert gases, or mixtures of such components with oxygen-containing species, such as CO, $CO_2$ or $H_2O$. Preferably, the methane-containing reactant gas contains water and the water to carbon molar ratio is between about 0.5 to about 5, the water to carbon molar ratio being defined as the number of molecules of water in the reactant gas divided by the total number of carbon atoms present in the hydrocarbons and carbon monoxide in the reactant gas.

The multicomponent metallic oxide compositions of matter according to the invention are represented by the formula:

$$(Ln_xCa_{1-x})_yFeO_{3-\delta} \qquad \text{Formula}$$

wherein
Ln is La or a mixture of lanthanides comprising La, and wherein $1.0 > x > 0.5$ $1.1 > y > 1.0$ and $\delta$ is a number which renders the composition of matter charge neutral.

In a preferred embodiment, $0.98 > x > 0.75$ and $1.05 > y > 1.01$.

For purposes of interpreting the Formula, the A-sites of the multicomponent metallic oxide are represented by Ln and Ca which bear stoichiometric coefficients x and 1−x, respectively. The B-site of the multicomponent metallic oxide according to the Formula is represented by Fe which bears the stoichiometric coefficient of 1 (not shown). The sum of the A-site stoichiometric coefficients $((x)+(1-x))$ multiplied by y wherein $1.0 > x > 0.5$ and $1.1 > y > 1.0$ is always greater than the stoichiometric coefficient of the B-site, Fe, which is one. Thus, the compositions of matter according to this invention are A-site rich materials. These A-site rich compositions of matter have the perovskite structure and are particularly suited toward use as a dense layer in a solid-state membrane suitable for use in processes for making syngas.

The compositions of matter of this invention may be prepared by conventional ceramic methods wherein respective amounts of metal oxides, carbonates, hydroxides, nitrates, or oxalates are mixed to achieve the desired cation fraction of the metal cation thereof. Suitable mixing can be effected by conventional means such as a technique selected from the group consisting of attrition milling, vibratory milling, ball milling and high sheer mixing. The resulting mixture is calcined to achieve a homogenous single phase, or nearly single phase, ceramic powder.

The compositions of matter according to the Formula can be used to form the dense layer of a solid-state membrane. While this Specification primarily addresses solid-state membranes comprising a dense layer formed from such compositions, alternate layers of the solid-state membrane may also be fabricated including compositions of matter according to the Formula.

In a preferred embodiment, the dense layer of the solid-state membrane is formed from a composition of matter according to the Formula wherein $0.98 > x > 0.75$ and $1.05 > y > 1.01$. The solid-state membranes having a dense layer formed from the compositions of matter according to the Formula are particularly suited for use in processes for making syngas because such compositions have sufficiently high oxygen flux, a sufficient chemical stability in the syngas and air environments, a sufficiently low creep rate, a sufficient resistance to demixing of the metal cations and a sufficiently low chemical expansion under membrane operating conditions.

The solid-state membrane of the present invention comprises a dense layer of a composition according to the Formula, and optionally one or more additional layers including, but not limited to porous layers and/or catalytic layers. Porous layers contiguous to the dense layer of solid-state membranes of this invention are preferably formed from a mixed conducting multicomponent metallic oxide although each porous layer, including those layers contiguous to the dense layer, may be formed from a electrically-conducting multicomponent metallic oxide, an oxygen ionically-conductive multicomponent metallic oxide or an inert material which does not conduct electrons or oxygen ions under process operating conditions.

The solid-state membrane comprising its respective layers is fabricated to possess a thickness sufficient to be mechanically stable to withstand the stresses associated with process operation, yet not so thick as to substantially limit the oxygen permeation rate through the solid-state membrane.

Solid-state membranes can be fabricated in a variety of shapes appropriate for a particular reaction zone within a reactor, including disks, tubes, closed-end tubes, planar designs or as reactor cores for cross-flow operation.

In the case where the solid-state membrane comprises a dense layer formed from the compositions of matter of this invention and one or more porous layers, a mixed conducting multicomponent metallic oxide layer is preferably employed for each porous layer contiguous to the dense layer. The porous mixed conducting oxide layer contiguous with the dense mixed conducting layer typically has a thickness ranging from 1 micrometer to about 2 millimeters. Porous layers not in contact with the dense layer, whether or not formed from a mixed conducting oxide, can be as thick as desired to ensure mechanical strength to the extent that the ultimate thickness does not impede gas diffusion. Typically, the total thickness of the solid-state membrane is less than about 5 mm, although solid-state membranes having a greater thickness are also contemplated.

The thickness of the dense mixed conducting layer typically ranges from 0.01 micrometer to about 500 micrometers although preferably, the dense layer is fabricated as thinly as permitted by structural integrity considerations and has a thickness of less than about 100 micrometers.

The thickness of each porous layer of the solid-state membrane, if so employed, can be varied to ensure sufficient mechanical strength of the solid-state membrane. The desired thickness of each porous layer is regulated according to the following considerations. First, the porosity and average pore radius of each porous layer should be regulated such that oxygen flux is not impeded while maintaining sufficient mechanical strength. Second, the pores or channels of pores within each porous layer should be wide enough so that oxygen flux is not impeded, but not so wide as to cause pore filling during fabrication or failure of the dense layer of the solid-state membrane during operation. Third, each porous layer should be compatible with the dense layer in terms of chemical reactivity and adhesion and thermal expansion to reduce problems associated with cracking and delamination.

The solid-state membranes can be fabricated by depositing a dense layer of the compositions of matter according to the Formula in a desired thickness onto one or more porous layers by known techniques. For example, the solid-state membrane can be manufactured by first forming a porous mixed conducting multicomponent metallic oxide layer from relatively coarse sized particles of the desired metal oxides. A slurry of finer particles of a compatible composition of matter according to the Formula, optionally including conventional binders, plasticizers and/or solvents, may then be coated onto the porous body and cured to the green state to form a green body, the two layer system then being sintered to form the solid-state membrane. Alternatively, the slurry can be spray dried to obtain a powder. This powder can then be isostatically pressed to form a green body. The green body obtained by these conventional ceramic techniques is then sintered.

Alternatively, the solid-state membranes of the present invention can be prepared by applying a dense layer of the desired mixed conducting oxide according to the Formula onto the desired porous substrate by conventional chemical vapor deposition techniques followed by sintering to obtain the desired dense layer. In order to obtain an optimal dense coating, a smaller average pore radius in the surface of the porous layer may be used compared to the average pore radius in the bulk. This may be achieved by using two or more porous layers which differ in properties such as pore radius and porosity.

Green bodies can be sintered in electric, gas, microwave, plasma, or other furnaces. Batch or continuous furnaces can effectively be used. Sintering temperatures should typically be below about 1600° C., preferably in the range of about 1200 to 1400° C. in order to maximize furnace and setter life times.

The dense layer of the membrane is preferably sintered to a density of 95% or above of theoretical density, preferably 99% or above of theoretical density. Theoretical density may be measured according to known methods, see e.g. G. H. Stront, L. H. Jensen, in "X-Ray Structure Determination, A Practical Guide", the Macmillan Company, Ltd., London, p. 80-81.

The composition of matter of the present invention and the solid-state membranes comprising the same may be stack fired, hang fired, or fired by use of any other means to minimize interaction of the solid-state membrane with the setter. Suitable setters known in the art may be used. In any case it is desired to prevent sticking between the setter and the solid-state membrane.

Such solid-state membranes may also include a catalyst on the first side, a catalyst on the second side or on the first side and the second side. By way of example, the first side may be referred to as the reactant side and the second side may be referred to as the oxidant side. Suitable catalysts to be deposited onto the reactant side are conventional reforming catalysts or partial oxidation catalysts such as a metal or an oxide of a metal selected from Groups 5, 6, 7, 8, 9,10, 11 of the Periodic Table of the Elements according to the International Union of Pure and Applied Chemistry. Preferred metals or oxides of metals are selected from the group consisting of nickel, cobalt, iron, platinum, palladium, and silver.

By way of example, the second side of the solid-state membrane may be referred to as the oxidant side. Suitable catalysts to be deposited onto the oxidant side are conventional oxygen reduction catalysts such as a metal or an oxide of a metal selected from the Groups 2, 5, 6, 7, 8, 9, 10, 11 and 15 and the F block lanthanides of the Periodic Table of the Elements according to the International Union of Pure and Applied Chemistry. Preferred metals or oxides of metals are selected from the group consisting of platinum, palladium, ruthenium, gold, silver, bismuth, barium, vanadium, molybdenum, cerium, praseodymium, cobalt, rhodium and manganese. Optionally, the catalyst may be any multicomponent metallic oxide which catalyzes the desired reaction.

The respective catalysts can be deposited onto or incorporated within any desired layer of the solid-state membrane by employing conventional techniques. Preferably, the catalysts are deposited onto the desired side of the solid-state membrane or incorporated within a desired layer of the solid-state membrane.

By way of example, a desired catalyst may be applied to the desired side of the solid-state membrane by a variety of techniques such as dip coating with a slurry or suspension of powder or spraying a suspension of powder, followed by drying and firing. Alternatively, the catalyst can be incorporated into a dense layer, porous layer or other layer by mixing the catalyst with the powder of the multicomponent metallic oxide which shall make up the layer prior to sintering the same to form a catalyst-containing layer of the solid-state membrane.

Applicants emphasize that the entire surface of the solid-state membrane does not have to be coated with catalyst in order to achieve the benefits afforded by use of the catalyst. For example, any selected pattern of catalyst may be deposited onto the surface by screen printing, masking and other techniques. Such patterns can be designed and applied according to currently used techniques which are well known in the art.

Solid-state membranes formed from the compositions of matter of this invention exhibit excellent long term oxygen flux stability and stability against demixing under operating conditions. Further, such solid-state membranes are stable under much higher partial pressures of carbon dioxide than the membrane compositions of the prior art. Finally, the solid-state membranes of this invention exhibit lower chemical expansion under operating conditions than solid-state membranes formed from prior art compositions.

The invention also presents a process for producing a synthesis gas product comprising hydrogen and carbon monoxide comprising the steps of:

a) providing a reaction zone having an oxidant side and a reactant side which are separated by a solid-state membrane comprising a dense layer formed from a composition of matter represented by the formula:

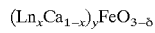

wherein
 Ln is La or a mixture of lanthanides comprising La, and wherein
 $1.0 > x > 0.5$
 $1.1 \geq y > 1.0$ and
 $\delta$ is a number which renders the composition of matter charge neutral, b) heating an oxygen-containing feed gas and introducing the resulting heated oxygen-containing feed gas in the oxidant side of the reaction zone at an oxidant feed temperature and an oxidant gas feed pressure;

c) heating a methane-containing reactant gas and introducing the resulting heated methane-containing reactant gas in the reactant side of the reaction zone at a reactant gas feed temperature and a reactant gas feed pressure;

d) permeating oxygen from the oxidant side of the reaction zone through the solid-state membrane to the reactant side of the reaction zone and reacting the oxygen with the methane-containing reactant gas to form the synthesis gas product;

e) withdrawing the synthesis gas product from the reactant side of the reaction zone at a product gas outlet temperature; and f) withdrawing an oxygen depleted gas stream from the oxidant side of the reaction zone at a product gas outlet temperature.

The oxygen containing feed gas in step (b) is preferably heated by direct combustion with a fuel in a direct-fired combustor to produce a hot, pressurized combustion product to provide the heated oxygen-containing feed gas.

Optionally, the process further comprises the steps of:

g) introducing a heated gaseous stream comprising steam and one or more hydrocarbons into a catalytic reforming reaction zone comprising at least one catalyst which promotes steam reforming of hydrocarbons to form a partially reformed intermediate gas comprising at least methane, hydrogen and carbon oxides; and h) introducing the partially reformed intermediate gas into the reactant side of the reaction zone of step c).

The term "partially reformed intermediate gas" as used herein refers to the product gas formed by the reaction of steam with a feed gas containing one or more hydrocarbons heavier than methane, and optionally containing ethane, wherein the reaction products comprise methane, carbon oxides, hydrogen, and steam (defined herein as vaporized or gaseous water). The partially reformed intermediate gas preferably is essentially free of hydrocarbons heavier than methane, which means that this gas contains less than about 100 ppm by volume of hydrocarbons heavier than methane.

Process operating conditions can be readily varied depending upon the particular methane-containing reactant gas or oxygen-containing feed gas utilized. Typically, the reactant feed gas temperature is between 950° F. (510° C.) and 1400° F. (760° C.) and the product gas outlet temperature is greater than about 1500° F. (815° C.). The oxidant gas feed pressure is between 1 psig (0.069 barG) and 45 psig (3.1 barG). The reactant gas feed pressure is between 100 psig (6.9 barG) and 900 psig (62 barG) and the oxidant gas feed temperature is up to 200° F. (111° C.) greater than the reactant gas feed temperature. The oxidant gas feed temperature is preferably less than the oxygen-depleted oxidant gas temperature.

A preferred process for employing solid-state membranes comprising the compositions of matter of this invention is presented in U.S. Pat No. 6,077,323, which is incorporated by reference herein. This process will be illustrated by reference to the attached FIG. 1, which is a process flow diagram of this preferred process of this invention.

Oxygen containing feed gas 1, preferably air, is pressurized in compressor 3 to a pressure in the range of about 0.069 to 3.1 barG, preferably less than about 10 psig (0.69 barG). While air is the preferred oxygen-containing feed gas, other oxygen-containing gases can be utilized as an oxygen source for the process. Pressurized oxygen containing gas 5 is preheated in heat exchanger 7 in heat transfer zone 9, and preheated oxygen-containing gas 11 is heated further by direct combustion with fuel 14 in burner 15 to yield heated oxidant 17 typically containing 15–20 vol-% oxygen at a temperature above 500° C. and preferably within ±200° C., more preferably with ±110° C. of the reactant feed temperature. Burner 15 represents any type of known, commercially available combustion device for promoting essentially complete combustion of fuel 14 in an excess oxygen environment.

Methane-containing reactant gas stream 19 is obtained at a pressure of about 100–900 psig (6.9–62.0 barG), preferably 200–400 psig (13.8–27.6 barG), optionally by compression or pressure reduction (not shown) of a source gas. Methane-containing reactant gas stream 19 can be a methane-containing gas from a petroleum refinery, petrochemical plant, or other industrial source, or can be natural gas obtained from a pipeline or directly from the wellhead after appropriate pretreatment. Methane-containing reactant gas stream 19 preferably is natural gas with a typical composition in the range of at least 80 vol % methane, less than 20 vol % ethane, less than 10 vol % propane, less than 5 vol % alkanes with more than 3 carbon atoms, less than 10 vol % carbon dioxide, less than 10 vol % nitrogen, and less than 100 ppmv total sulfur.

Methane-containing reactant gas stream 19 optionally is combined with a stream of hydrogen 21 and optionally heated in heat exchanger 23 in heat transfer zone 9 to a temperature up to 450° C. The resulting heated stream optionally is passed through desulfurization/hydrogenation reaction zone 25 containing a hydrogenation catalyst which typically comprises cobalt and molybdenum or nickel and molybdenum. In reaction zone 25, olefinic hydrocarbons are converted to paraffins and organic sulfur compounds are converted into hydrogen sulfide which is sorbed on a layer of zinc oxide in the reactor. Typically one reactor vessel containing hydrogenation catalyst is operated in series with two reactors filled with zinc oxide which are operated in parallel (not shown) with one onstream and one being regenerated.

Treated methane-containing gas 27 (which may contain residual hydrogen) is optionally combined with steam 29 and/or carbon dioxide 31, and the combined stream is heated to about 500 to 800° C. in heat exchanger 33 in heat transfer zone 9 to yield heated reactant feed gas 35. Preferably steam is used, and the water to carbon molar ratio is between about 0.5 to about 5, the water to carbon molar ratio being defined as the number of molecules of water in heated reactant feed gas 35 divided by the total number of carbon atoms present in the hydrocarbons and carbon monoxide in heated reactant feed gas 35.

Heated oxidant 17 and heated reactant feed gas 35 are introduced into mixed conducting membrane reaction zone 37. Mixed conducting membrane reaction zone 37 is shown schematically having an oxidant zone 43 separated from reactant zone 45 by mixed conducting membrane 47 of the invention, and is presented in this simplified format for the following description of the reactor operation. Oxidant zone 43 represents a reactor volume through which the oxidant gas flows and contacts the oxidant side surface of the mixed conducting LCF-membrane of this invention 47. Dioxygen is ionized at this surface to form oxygen ions and the oxygen ions permeate the mixed conducting LCF-membrane of this invention 47 to the reactant side surface of the LCF-membrane. The surface of mixed conducting membrane 47 in oxidizing side 43 optionally can be coated with catalytic material to promote the transfer of oxygen into the membrane as discussed above.

Reactant zone 45 represents a reactor volume through which the methane-containing reactant gas flows and reacts with oxygen which has permeated through the solid-state membrane 47 comprising a dense layer formed from a composition of matter according to the formula. A number of known chemical reactions occur in reactant zone 45 among the several chemical species present including oxygen, hydrogen, water, carbon monoxide, carbon dioxide, methane, and possibly elemental carbon. For a further detailed discussion of these reactions and their implications on the process, the reader is referred to U.S. Pat. No. 6,077,323.

The presence of hydrogen or steam in the feed is beneficial for preventing carbon deposition. A mixture of natural gas and steam would typically be limited to a preheat temperature of about 550° C. A mixture containing methane, steam, and hydrogen, but no hydrocarbons heavier than methane, could be heated to higher temperatures above about 650° C. depending on the relative concentrations of the components. Once the reactant gas enters reaction zone 37 and begins to react, the heavier hydrocarbons quickly disappear and a substantial amount of hydrogen is formed, so that cracking becomes progressively less likely in the successive zones of the reactor. The gradual permeation of oxygen through mixed conducting membrane 47 into the reactant is also beneficial in reducing the likelihood of carbon deposition.

The total gas pressure at any point in reactant zone 45 is about 100–900 psig (6.9–62 barG), preferably 200–400 psig (13.8–22.6 barG), and a small pressure drop occurs from inlet 41 to outlet 49. The total gas pressure at any point in oxidant zone 43 is in the range of about 1 to about 45 psig (0.069–3.1 barG), preferably less than about 10 psig (0.69 barG), and a small pressure drop occurs from inlet 39 to outlet 55. Thus the total pressure at any point in the reactant zone is greater than the total pressure at any point in the oxidant zone. The membrane of the invention withstands this pressure difference without cracking or deterioration of properties, especially of oxygen flux.

Hot syngas product 51 is withdrawn at outlet 49 of membrane reaction zone 37 at a temperature of greater than about 816° C. and cools in downstream equipment. Syngas product 51 contains hydrogen and carbon monoxide with a hydrogen to carbon monoxide molar ratio of 1 to 6. Oxygen-depleted oxidant 53 is withdrawn at outlet 55 at a temperature below that of product syngas 51.

Oxygen-depleted oxidant 53 is introduced into heat transfer zone 9 and exits therefrom as cooled flue gas 57. A major portion of the heat content of hot oxygen-depleted oxidant 53 is transferred via heat exchangers 7, 23, and 33 to heat process streams as earlier described. Heat transfer zone 9 can be similar to flue gas heat recovery systems used in conventional steam-methane reforming.

Hot syngas product 51 may be cooled rapidly to a temperature below 430° C. against boiling water by indirect heat transfer in waste heat boiler 59 and is further cooled against other process streams (later defined) in one or more heat exchangers 61, 63, 65, and 67. Cooled syngas 69 passes into phase separator 71 from which condensed water 73 is withdrawn and combined with boiler feedwater makeup 75. The combined water stream is heated in heat exchanger 65 to yield preheated boiler feedwater 77 which is degasified and deaerated (not shown) for use in waste heat boiler 59.

Alternatively, if the process makes excess water, a portion of condensate 73 is preheated in heat exchanger 65 and the remainder is discharged as wastewater (not shown). Depending on the end use of the syngas, cooled and dewatered syngas 79 optionally is treated in carbon dioxide removal system 81 using known methods to remove some or all of the carbon dioxide contained in the raw syngas product. Processed syngas 85 is compressed as required in compressor 87 to yield final syngas product 89.

Optionally, a portion of carbon dioxide 83 removed from the raw syngas is compressed in compressor 91 to provide carbon dioxide recycle 31 as earlier described. Optionally, a portion 93 of syngas 85 is separated using known methods such as pressure swing adsorption system 95 to recover hydrogen 21 which is used for hydrogenation of feed gas 19 as earlier described. Waste gas 97 from pressure swing adsorption system 95 can be combined with fuel 13 to provide fuel 14 in burner 15 for heating oxygen-containing feed gas 11.

In an alternative embodiment of the invention, steam 29 is not utilized and instead treated methane-containing gas 27 is directly saturated with water vapor before final heating and introduction into mixed conducting membrane reaction zone 37.

The present invention will be further illustrated by the following examples, which are given for illustrating purposes only and are not intended to limit the scope of protection.

EXAMPLE 1

Preparation of Multicomponent Metallic Oxides

The compositions identified in Table 1 were prepared by known powder preparation techniques wherein the specified parts by weight of the respective metallic oxides were vibratory milled together for 72 hours. The mixture of metallic oxides was then fired in air at 1200° C. for 10 hrs. Thereafter, the mixture was ground by vibratory milling for 72 hrs yielding a powder. The powder was combined with a polyvinyl butyral binder, butyl benzyl phthalate plasticizer and an ethanol/toluene solvent to form a slip suitable for tape casting. The slip was cast into a tape and dried using conventional methods. Rectangular sections were cut from the tape using standard methods.

If necessary, several rectangular sections were laminated together to form a solid-state membrane having sufficient thickness. The solid-state membrane was fired in air to remove the plasticizer, binder and solvent followed by sintering at 1400° C. for 2 hours to produce a solid-state membrane having a thickness of about 2 millimeters consisting of a dense mixed conducting multicomponent metallic oxide layer.

TABLE 1

| Ex No. | Composition | Ratio A/B | $La_2O_3$ (pbw) | $CaCO_3$ (pbw) | $SrCO_3$ (pbw) | $Fe_2O_3$ (pbw) | $Al_2O_3$ (pbw) |
| --- | --- | --- | --- | --- | --- | --- | --- |
| 1 | $(La_{0.85}Ca_{0.15})_{1.01}FeO_{3-\delta}$ | 1.01 | 0.5955 | 0.0646 | — | 0.3400 | — |
| 2 | $(La_{0.85}Ca_{0.15})_{0.98}FeO_{3-\delta}$ | 0.98 | 0.5893 | 0.0639 | — | 0.3468 | — |
| 3 | $(La_{0.85}Sr_{0.15})_{1.01}FeO_{3-\delta}$ | 1.01 | 0.5777 | — | 0.0924 | 0.3299 | — |
| 4 | $(La_{0.75}Ca_{0.25})_{0.98}FeO_{3-\delta}$ | 0.98 | 0.5343 | 0.1094 | — | 0.3563 | — |
| 5 | $(La_{0.15}Sr_{0.85})_{1.0}Fe_{0.7}Al_{0.3}O_{3-\delta}$ | 1.0 | 0.1105 | — | 0.5675 | 0.2528 | 0.0692 |
| 6 | $(La_{0.8}Ca_{0.2})_{1.01}FeO_{3-\delta}$ | 1.01 | 0.5681 | 0.0873 | — | 0.3446 | — |
| 7 | $(La_{0.9}Ca_{0.1})_{1.01}FeO_{3-\delta}$ | 1.01 | 0.6221 | 0.0425 | — | 0.3354 | — |
| 8 | $(La_{0.95}Ca_{0.05})_{1.01}FeO_{3-\delta}$ | 1.01 | 0.6480 | 0.0210 | — | 0.3310 | — |

Figure 2:
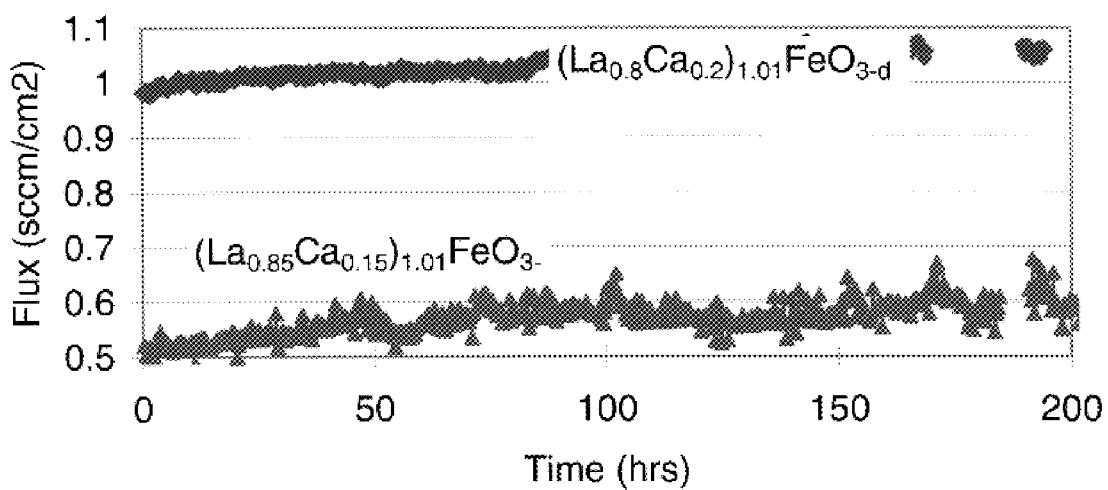
FIG. 2 is a graph showing oxygen flux performance versus time for two solid-state membranes of the invention.
Figure 3:
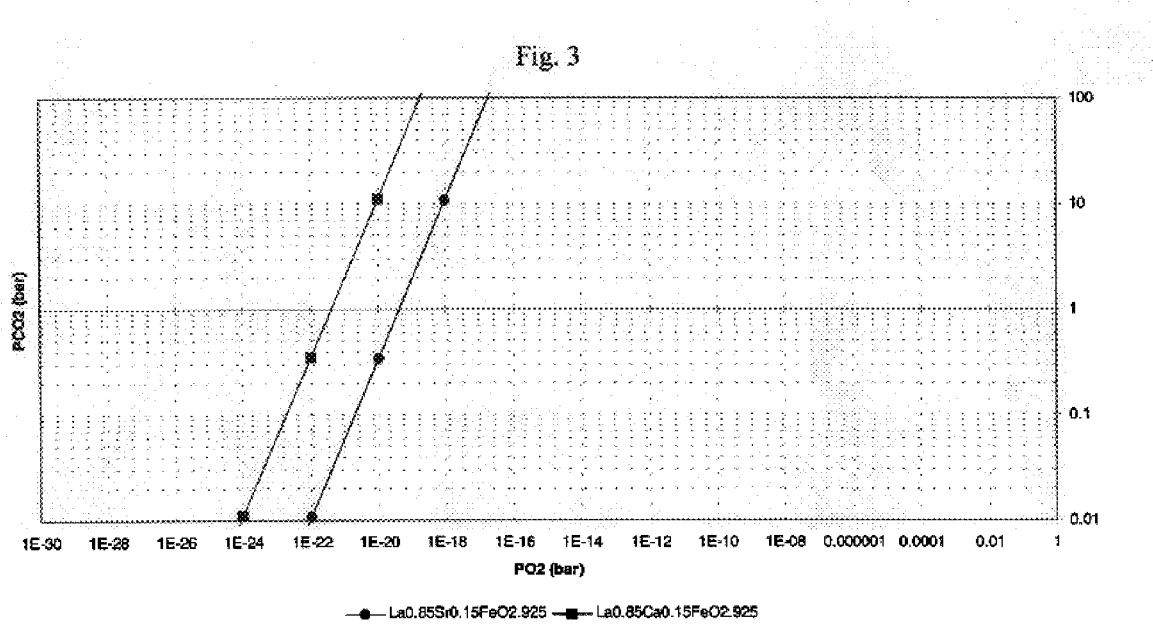
FIG. 3 is a graph showing equilibrium concentrations of $CO_2$ and $O_2$ for decomposition of $La_{0.85}Ca_{0.15}FeO_{3-\delta}$ and $La_{0.85}Sr_{0.15}FeO_{3-\delta}$, respectively.

Solid-state membranes consisting of a dense layer formed from the respective compositions of matter presented in Ex. Nos. 1 through 8 of Table 1 were tested for oxidant flux performance over time by applying an oxygen partial pressure gradient. Oxygen flux performance for Example Nos. 1 and 6 is shown in FIG. 2. These oxygen fluxes meet the requirements of commercial syngas production and are sufficiently stable with time.

EXAMPLE 2

Expansion Testing of Solid-State Membranes

Solid-state membrane formed from the compositions of matter identified in Ex. Nos. 1, 4, and 5 of Table 1 were prepared according to Example 1. Such solid-state membranes were tested under the following specified conditions for their expansion upon changing $P_{O2}$. The respective solid-state membranes were placed in a dilatometer and heated to 750° C./950° C. in pure oxygen. After equilibrating at 750° C., the atmosphere inside the dilatometer was switched to a $H_2/H_2O/N_2$ mixture having oxygen partial pressure of given in Table 2. The dilatometer recorded the change in length of the solid-state membranes with the change in oxygen partial pressure.

The results of the test are shown in Table 2 which demonstrates that a representative composition of the present invention $(La_{0.85}Ca_{0.15})_{1.01}FeO_{3-\delta}$ shows much lower expansion under pressure than the prior art compositions $(La_{0.75}Ca_{0.25})_{0.98}FeO_{3\delta}$ and $(La_{0.15}Sr_{0.85})_{1.0}FeO_{0.7}Al_{0.3}O_{3-\delta}$.

One of ordinary skill in the art will recognize that under typical syngas process conditions, the solid-state membrane will be subjected to mechanical stresses arising from the pressure gradient on opposite sides of the solid-state membrane. Solid-state membranes comprising a dense layer formed from a composition having a low expansion coefficient will be subjected to less mechanical stress than solid-state membranes formed from a composition having a relatively higher expansion coefficient. Thus, solid-state membranes formed from the compositions of matter according to this invention will provide improved reliability and service life.

TABLE 2

| Ex. No. | Composition | Final $P_{O2}$ (atm) | Expansion (ppm) |
|---|---|---|---|
| 1 | $(La_{0.85}Ca_{0.15})_{1.01}FeO_{3-\delta}$ | $5.5 \times 10^{-21}$ | 1820 |
| 4 | $(La_{0.75}Ca_{0.25})_{0.98}FeO_{3-\delta}$ | $5.5 \times 10^{-21}$ | 4060 |
| 5 | $(La_{0.15}Sr_{0.85})_{1.0}Fe_{0.7}Al_{0.3}O_{3-\delta}$ | $2.8 \times 10^{-13}$ | 3918 |

EXAMPLE 3

Stability of Multicomponent Metallic Oxides

Figure 4:
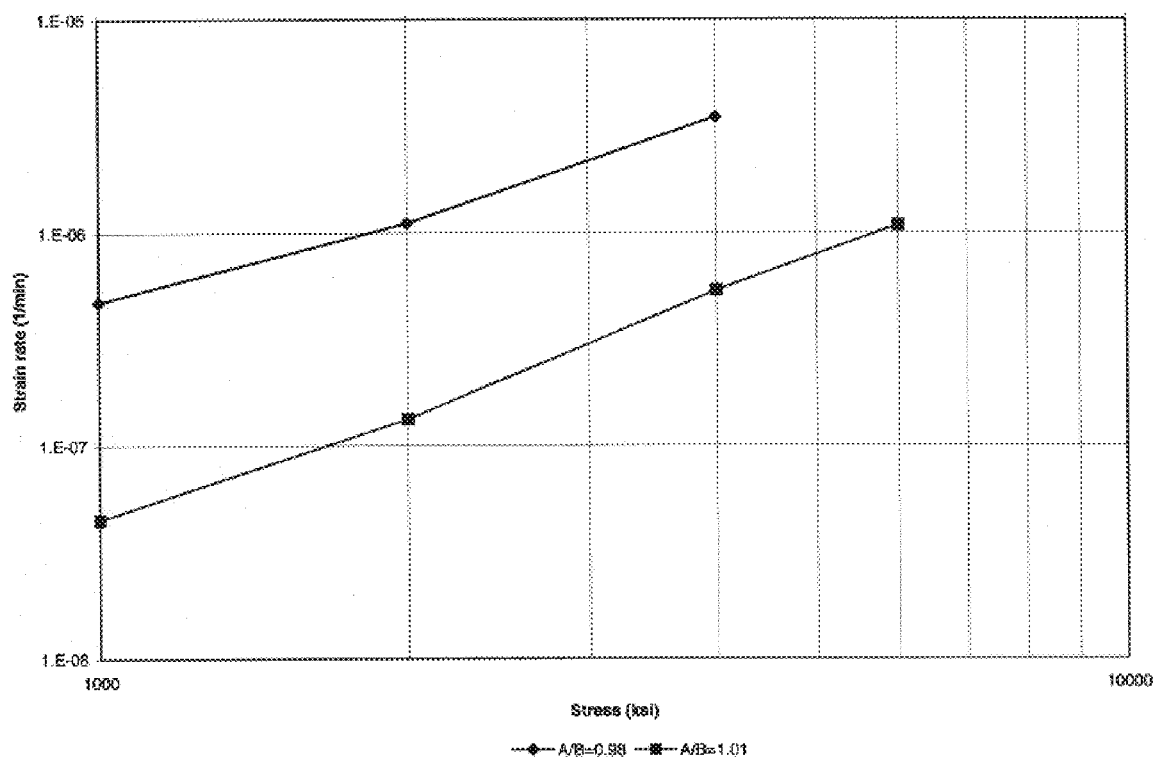
FIG. 4 is a graph showing creep rates for an A-site rich composition of matter of the present invention (Example No. 1 of Example 1) versus an A-site deficient composition (Example No. 2 of Example 1).

To evidence improved stability afforded by the solid-state membranes of this invention, the equilibrium conditions for the reaction of $(La_{0.8}Ca_{0.15})_{1.01}FeO_{2.925}$ and $(La_{0.85}Sr_{0.15})_{1.01}FeO_{2.925}$ with $CO_2$ to form $LaFeO_3$, alkaline earth carbonate, Fe and oxygen at 750° C. are shown in FIG. 4. FIG. 4 shows equilibrium concentrations of $CO_2$ and $O_2$ for the reactions: $(La_{0.85}Ca_{0.15})_{1.01}FeO_{2.95} + 0.15CO_2 \leftrightarrow 0.15CaCO_3 + 0.85LaFeO_3 + 0.004La_2O_3 + 0.15Fe + \frac{3}{4}(0.15)O_2$ and $(La_{0.85}Sr_{0.15})_{1.01}FeO_{2.95} + 0.15CO_2 \leftrightarrow 0.15SrCO_3 + 0.85LaFeO_3 + 0.004La_2O_3 + 0.15Fe + \frac{3}{4}(0.15)O_2$.

These numbers were calculated using the FACT integrated thermochemical database for the free energy of formation of the reactants and products. FACT (*Facility for the Analysis of Chemical Thermodynamics*) was established as a joint research project between McGill University and Ecole Polytechnque de Montreal. The free energy of formation of $(La_{0.85}Ca_{0.15})_{1.01}FeO_{2.925}$ and $(La_{0.85}Sr_{0.15})_{1.01}FeO_{2.925}$ respectively. At a given oxygen partial pressure, $(La_{0.85}Ca_{0.15})_{1.01}FeO_{2.925}$ can be exposed to a much higher partial pressure of $CO_2$ than $(La_{0.85}Sr_{0.15})_{1.01}FeO_{2.925}$ before it will react with $CO_2$. Therefore, $(La_{0.85}Ca_{0.15})_{1.01}FeO_{2.925}$ is more stable than $(La_{0.85}Sr_{0.15})_{1.01}FeO_{2.925}$. $(La_{0.85}Ca_{0.15})_{1.01}FeO_{2.925}$ is more in applications requiring exposure to high partial pressures of $CO_2$ at low oxygen partial pressures such as found in the reactant zone of a membrane reactor for syngas production, as described above.

EXAMPLE 4

Creep Measurement of Solid-State Membranes

The solid-state membranes consisting of a dense layer of the respective compositions of Ex. Nos. 1 and 2 according to Table 1, were prepared according to the procedure of Example 1. Each solid-state membrane was individually placed in an apparatus using a four point bend arrangement to measure creep rate. A description of a suitable technique for this measurement can be found in Chapter 5 of "*Mechanical Testing Methodoloay for Ceramic Design and Reliability*" edited by David C. Cramer and David W. Richerson published by Marcel Decker, Inc., 1998. Each individual solid-state membrane was heated to 950° C. and stresses of 1000–6000 psi (1–6 ksi) (6.9–41.4 MPa) were applied thereto.

The deflection of the respective solid-state membranes was measured as a function of time, from which the strain rate was calculated. The creep rates are presented in FIG. 4 for the solid-state membranes formed from Ex. Nos. 1 (A/B=1.01) and 2 (A/B=0.98). The creep rates for the solid-state membrane formed from Composition No. 1 are nearly an order of magnitude lower than the creep rates of the solid-state membrane formed from Composition No. 2. Therefore compositions with an A/B ratio >1 have significantly lower creep rates than membranes with an A/B ratio <1.0.

EXAMPLE 5

Syngas Production

A tubular solid-state membrane consisting of a dense layer of the composition $(La_{0.85}Ca_{0.15})_{1.01}FeO_{3-\delta}$, was fabricated by consolidating a mixture of the ceramic oxide powder, polyvinylbutyral binder and butyl benzyl phthalate plasticizer, by isostatic pressing in a shaped tool. The pressed tube was then fired in air in a controlled manner to remove the plasticizer, followed by sintering at 1400° C. for 2 hours to produce a dense mixed conducting multicomponent metallic oxide membrane 1 in form of a tube having a thickness of about 0.95 mm.

After firing, the exterior surface of the tube was machined to final dimensions and coated externally with an approximately 100 μm thick porous layer of a surface reforming catalyst 2 consisting of 30% by weight Ni dispersed on $(La_{0.75}Ca_{0.25})_{1.01}FeO_{3-\delta}$. The tube was also coated internally with an approximately 10 μm thick porous layer of an oxygen reduction catalyst 3, $La_{0.49}Sr_{0.49}CoO_{3-\delta}$. The catalyst layers were fired onto the tube prior to testing in order to partially consolidate the catalyst particles and in order to remove any organic components.

The resulting tubular solid-state membrane was closed on one end and had an average wall thickness of 0.95 mm and an mean active surface area of ~14.5 cm². The open end of the tubular membrane was sealed into a Haynes 230 alloy tube 4 with a ceramic/metal compression seal 5, and placed in a heated tubular reactor vessel fitted with an alumina liner 6. An alumina air feed tube 7 was inserted into the interior of the sample such that the pre-reformed natural gas feed mixture and the air feed flowed in the reactor vessel in a largely co-axial manner.

A pre-reformed natural gas mixture (composition given in Table 3) was supplied to the outside of the membrane tube at a pressure of 250 psia (1.78 MPa) and a flow rate of approximately 730 standard cm³/min, while air at atmospheric pressure was contacted with the inside of the tubular solid-state membrane at a flow rate of approximately 750 standard cm³/min. The average temperature of the tubular solid-state membrane was 810° C.

TABLE 3

PRE-REFORMED NATURAL GAS FEED COMPOSITION

| Gas Component | Mole % |
|---|---|
| $CH_4$ | 4.80 |
| CO | 16.85 |
| $CO_2$ | 10.68 |
| $H_2$ | 41.92 |
| $H_2O$ | 25.75 |
| Total | 100.00 |

Under these conditions, oxygen was transported through the tubular solid-state membrane to partially oxidize the pre-reformed natural gas mixture. A typical product gas composition is given in Table 4. The oxygen flux through the tubular solid-state membrane was calculated by performing a mass balance on both the natural gas mixture feed and oxidized product stream, and on the air feed and oxygen depleted exhaust stream. Over a period of fifteen days continuous operation, the tubular solid-state membrane exhibited a stable flux of oxygen from the air to the pre-reformed natural gas mixture of approximately 2.0 standard $cm^3$ oxygen/min/$cm^2$ of active membrane surface.

TABLE 4

PARTIALLY OXIDIZED PRODUCT GAS COMPOSITION

| Gas Component | Mole % |
|---|---|
| $CH_4$ | 4.05 |
| CO | 14.21 |
| $CO_2$ | 12.58 |
| $H_2$ | 37.05 |
| $H_2O$ | 32.11 |
| Total | 100.00 |

Those skilled in the art will appreciate that the claimed multicomponent metallic oxides are particularly suited toward use in fabricating solid-state membranes suitable for producing syngas. Applicants set forth their invention as described in the claims which are appended hereto.

We claim:

1. A solid-state membrane which comprises a first side and a second side wherein the solid-state membrane comprises a dense layer formed from a composition of matter represented by the formula:

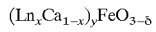

$(Ln_xCa_{1-x})_yFeO_{3-\delta}$ wherein

Ln is La or a mixture of lanthanides comprising La, and wherein $1.0 > x > 0.5$ $1.1 \geq y > 1.0$ and $\delta$ is a number which renders the composition of matter charge neutral.

2. The solid-state membrane of claim 1 wherein the dense layer is formed from a composition of matter according to the formula wherein $0.98 > x > 0.75$ and $1.05 \geq y \geq 1.01$.

3. The solid-state membrane of claim 1 which further comprises a porous mixed conducting multicomponent metallic oxide layer contiguous to the dense layer.

4. The solid-state membrane of claim 1 which further comprises a catalyst on the first side, a catalyst on the second side or on the first side and the second side.

5. The solid-state membrane of claim 4 wherein the catalyst on the first side of the solid-state membrane comprises a metal or an oxide of a metal selected from Groups 5, 6, 7, 8, 9, 10, 11 of the Periodic Table of the Elements according to the International Union of Pure and Applied Chemistry.

6. The solid-state membrane of claim 5 wherein the catalyst comprises a metal or an oxide of a metal selected from the group consisting of nickel, cobalt, iron, platinum, palladium, and silver.

7. The solid-state membrane of claim 4 wherein the catalyst on the second side of the solid-state membrane comprises a metal or an oxide of a metal selected from the Groups 2, 5, 6, 7, 8, 9, 10, 11 and 15 and the F block lanthanides of the Periodic Table of the Elements according to the International Union of Pure and Applied Chemistry.

8. The solid-state membrane of claim 7 wherein the metal or the oxide of the metal is selected from the groups consisting of platinum, palladium, ruthenium, gold, silver, bismuth, barium, vanadium, molybdenum, cerium, praseodymium, cobalt, rhodium and manganese.

9. The solid-state membrane of claim 4 wherein the catalyst on the second side is a multicomponent metallic oxide.

* * * * *